US006421137B1

(12) United States Patent
Endo

(10) Patent No.: US 6,421,137 B1
(45) Date of Patent: Jul. 16, 2002

(54) IMAGE FORMING APPARATUS

(75) Inventor: Soya Endo, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/298,827

(22) Filed: Apr. 26, 1999

(30) Foreign Application Priority Data

Apr. 27, 1998 (JP) .......................................... 10-117311
Apr. 22, 1999 (JP) .......................................... 11-114777

(51) Int. Cl.[7] ................................................ G06F 13/00
(52) U.S. Cl. ......................... 358/1.16; 358/1.17; 711/6; 711/115
(58) Field of Search ............................... 358/1.14, 1.15, 358/1.16, 1.17, 523, 524, 404, 444; 711/3, 6, 115; 382/303, 304, 305

(56) References Cited

U.S. PATENT DOCUMENTS 5,452,444 A * 9/1995 Solomon et al. ............... 714/6
5,765,193 A * 6/1998 Rosich et al. ............... 711/136

FOREIGN PATENT DOCUMENTS

| | | |
|---|---|---|
| JP | 4-299375 | 10/1992 |
| JP | 6-130754 | 4/1994 |

* cited by examiner

*Primary Examiner*—Mark Wallerson
(74) *Attorney, Agent, or Firm*—Fitzpatrick, Cella, Harper & Scinto

(57) ABSTRACT

In an image forming apparatus in which a photosensitive drum has the form of a cartridge, a non-volatile memory is provided on the cartridge and a cumulative number of times image forming has been performed is stored in the non-volatile memory, a write-in-progress flag is set in the memory before a data set is written to the memory of the cartridge, and the write-in-progress flag is reset after writing of a data set to the memory ends. A plurality of identical data sets are written to the memory. If, when data sets are read out of the memory, there is a data set for which the write-in-progress flag is still in the set state, it is judged that the write operation for this data set ended in mid-course and, hence, the content of this data set is rewritten to the content of another valid data set.

24 Claims, 9 Drawing Sheets

IMAGE FORMING APPARATUS

BACKGROUND OF THE INVENTION

1. Field of the Invention

This invention relates to an image forming apparatus in which a cartridge provided with a memory is capable of being removably inserted. More particularly, the invention relates to the writing of data to the memory of the cartridge.

2. Description of the Related Art

A printer such as described in the specifications of Japanese Patent Application Laid-Open (KOKAI) Nos. 4-299375 and 6-130754 uses a cartridge, which is a combination of a drum and toner container, fitted with a non-volatile memory to which data indicating drum life and number of prints made is written. Drum life and amount of remaining toner are sensed by referring to this data. For sake of safety, there are instances where the data is written to plurality of areas and managed as a plurality of data sets. A data set for which an error has occurred is not used.

However, in case where error in a data set is detected as by a checksum, it is not possible to determine whether the error occurred because of a malfunction in the non-volatile memory, such as an EEPROM, itself or because of an incomplete write operation as caused by turning off a power supply while the writing of data to the non-volatile memory was in progress. Consequently, any data set for which an error has occurred is not used across the board. Accordingly, a considerably number of data sets having identical data content must be prepared on the assumption that a write failure as caused by turning off a power supply may occur repeatedly.

Further, a problem that arises when a data set develops an error is how to select a correct data set in order to effect recovery of the faulty data set.

SUMMARY OF THE INVENTION

An object of the present invention is to provide an image forming apparatus and a method of controlling the image forming apparatus that solve the aforementioned problems.

Another object of the present invention is to provide an image forming apparatus, as well as a method of controlling this apparatus, in which the status of a cartridge can be judged in accurate fashion and redundancy of data for managing the cartridge can be reduced.

A further object of the present invention is to provide an image forming apparatus, as well as a method of controlling this apparatus, in which recovery from error in a data set that has been stored in memory can be achieved easily and reliably.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

[First Embodiment]

Figure 1:
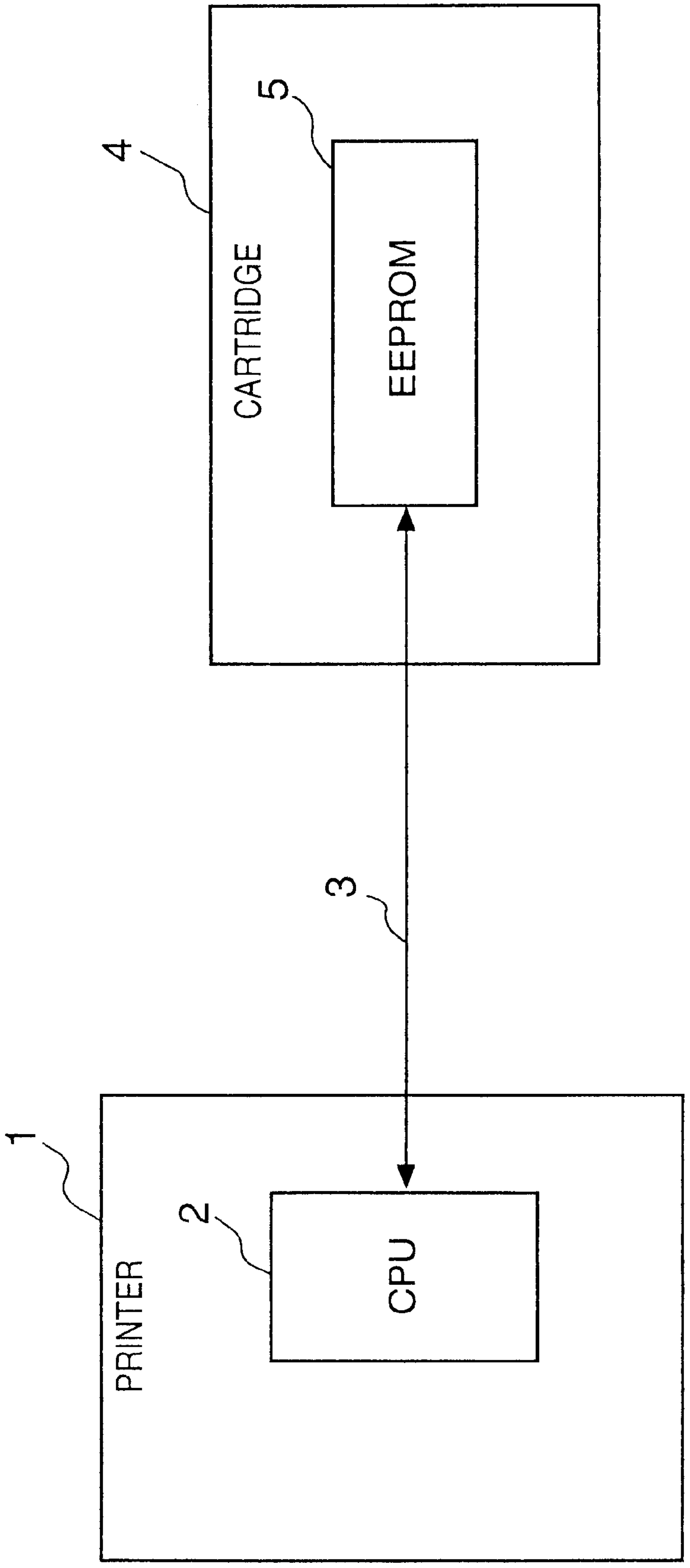
FIG. 1 is a block diagram showing the construction of an image forming apparatus according to a first embodiment of the present invention.

FIG. 1 is a block diagram illustrating the construction of an image forming apparatus according to a first embodiment of the present invention.

A printer 1 in FIG. 1 forms images by electrophotography and has such components as a laser drive circuit, a photosensitive drum, a toner supply section, a corona discharge section, a developing unit, a fixing unit and a paper supply system, which are for implementing image formation by electrophotography. According to this invention, the printer includes a cartridge 4 obtained by combining the photosensitive drum with a toner container. The printer 1 has a CPU 2 for performing various control operations, such as control of operation of the printer 1. The CPU 2 is a single-chip CPU incorporating a ROM (not shown), a RAM (not shown) and an input/output (I/O) unit. The cartridge 4 has a non-volatile memory 5. An EEPROM is used as the non-volatile memory 5 in this invention.

The EEPROM 5 is incorporated within the cartridge 4 and data for managing the status of the printer 1, such as its drum life and number of prints produced, is written to and read from the EEPROM by control exercised by the CPU 2. Numeral 3 denotes an interface line between the EEPROM 5 and CPU 2 connected by a connector or the like when the cartridge 4 is installed in the printer 1.

The memory map of the EEPROM 5 will be described with reference to FIG. 2.

Figure 2:
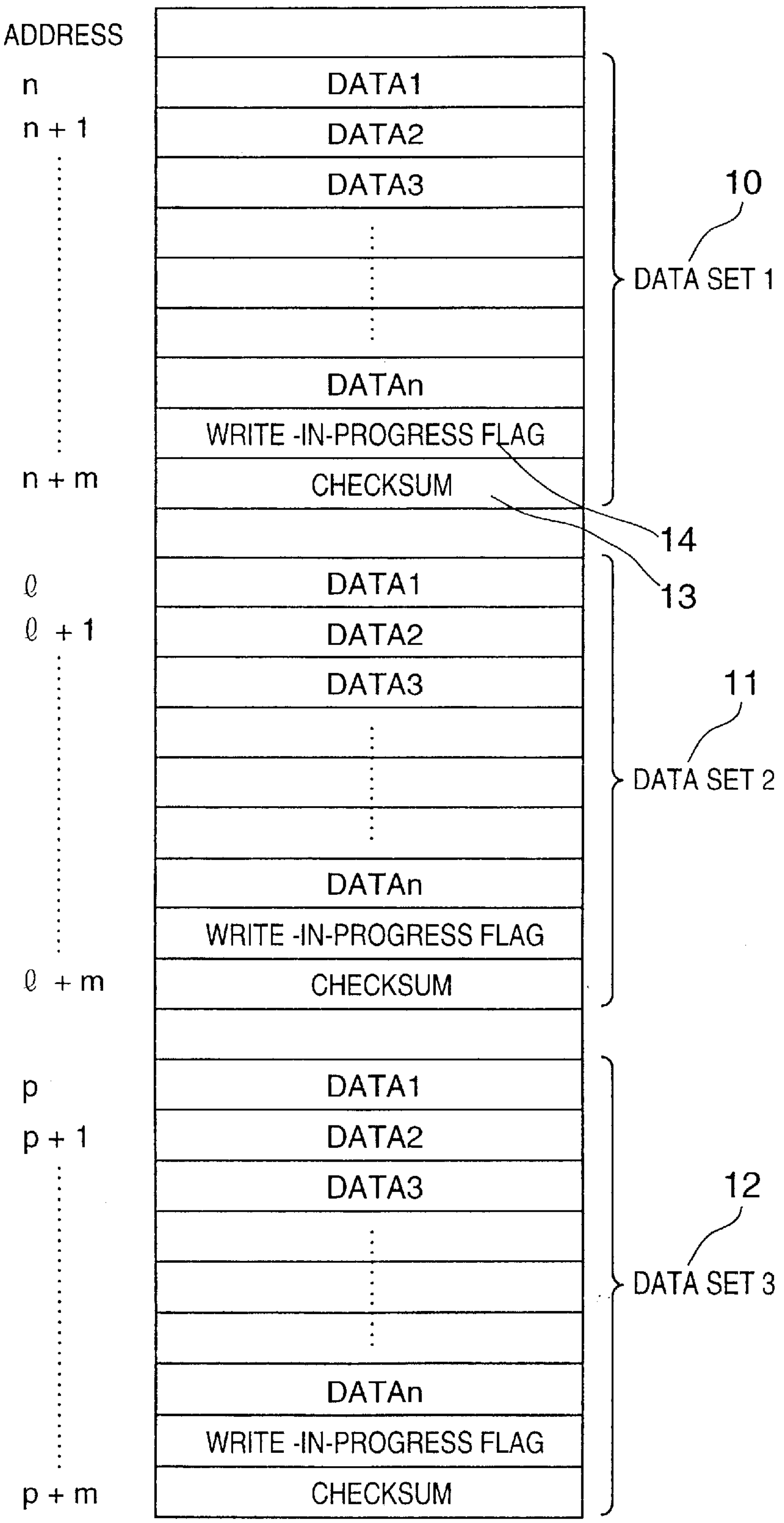
FIG. 2. is a diagram showing the memory map of an EEPROM according to the first embodiment.

FIG. 2 is a diagram illustrating the memory map of the EEPROM according to the first embodiment of the present invention.

According to the first embodiment, three data sets are stored in the EEPROM 5.

As shown in FIG. 2, a data set 1, a data set 2 and a data set 3 indicated at numerals 10, 11, and 12, respectively, have the same content. Each data set is composed of a data section (e.g., data for managing drum life and number of prints produced), a checksum section 13 and a write-in-progress flag 14 (e.g., one word) for managing the propriety of writing a data set.

An operation for writing data sets to and reading data sets out of the EEPROM 5 will now be described in conjunction with the flowcharts of FIGS. 3, 4 and 5. It should be noted that the operation for writing data sets is carried out after formation of an image is completed and a high-voltage power source turned off.

Figure 3:
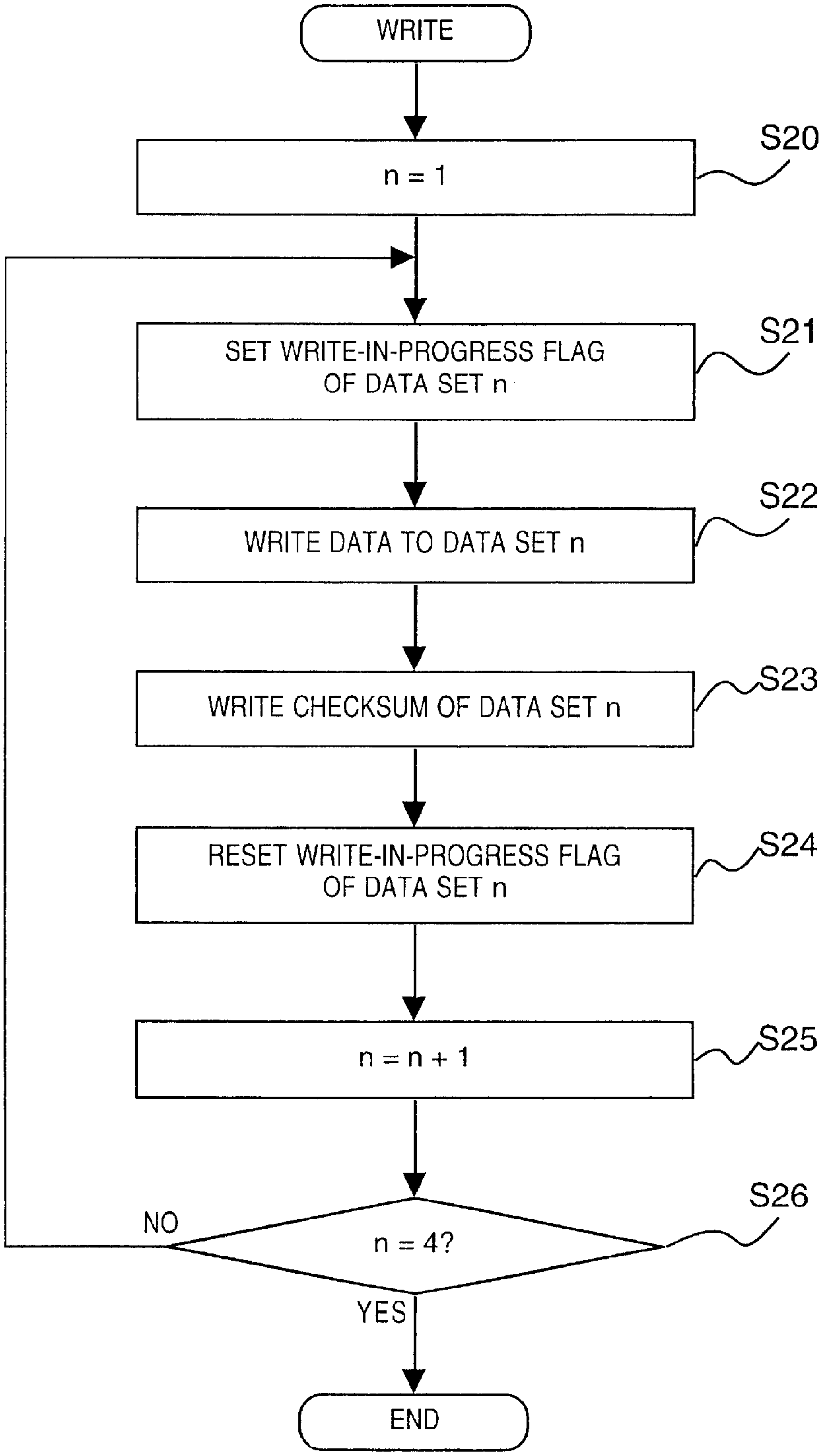
FIG. 3 is a flowchart showing an operation for writing a data set to the EEPROM in the first embodiment.

FIG. 3 is a flowchart showing the operation for writing data sets to the EEPROM according to the first embodiment of the invention.

Step S20 in FIG. 3 calls for 1 to be set in a counter (not shown) for counting n, which indicates the number of a data set to be written to the EEPROM 5. A data set is always written to the EEPROM starting from n=1. This is followed by step S21, at which the write-in-progress flag of data set n is set, and then by step S22, at which the actual data is written to the EEPROM 5. Next, a checksum, which is obtained by summing the data section of the data set n, is calculated and written to the EEPROM 5 at step S23. The write-in-progress flag does not enter into the calculation of the checksum. This is because the write-in-progress flag is reset following the writing of the checksum.

When the writing of the data set n to the EEPROM ends, the write-in-progress flag of the data set n is reset at step S24. This is followed by step S25, at which the value in the counter is incremented, and then by step S26, at which it is determined whether the writing of all data sets 1, 2 and 3 is finished. In accordance with the first embodiment, the determination as to whether the writing of all data sets 1, 2 and 3 is finished is made by judging whether the value in the counter is 4. If the writing of all data sets has not been completed ("NO" at step S26), control returns to step S21. If the writing of all data sets has been completed ("YES" at step S26), then processing is terminated.

The operation for reading data sets out of the EEPROM 5 will be described with reference to FIGS. 4 and 5. It should be noted that the operation for reading out data sets is executed following closure of a cartridge extraction door, which is performed after the printer power source is turned off.

Figure 4:
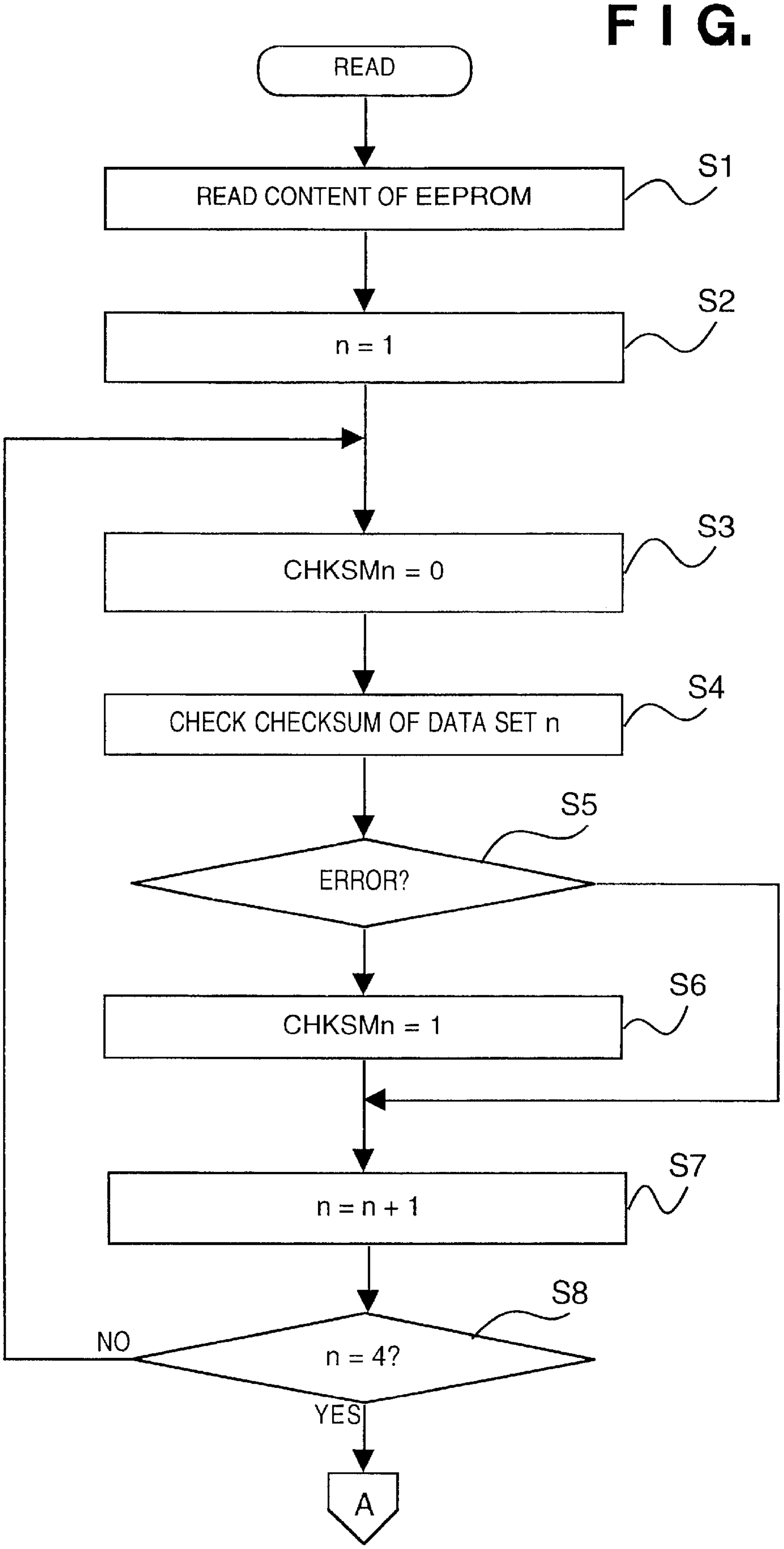
FIG. 4 is a flowchart showing an operation for reading a data set out of the EEPROM in the first embodiment.
Figure 5:
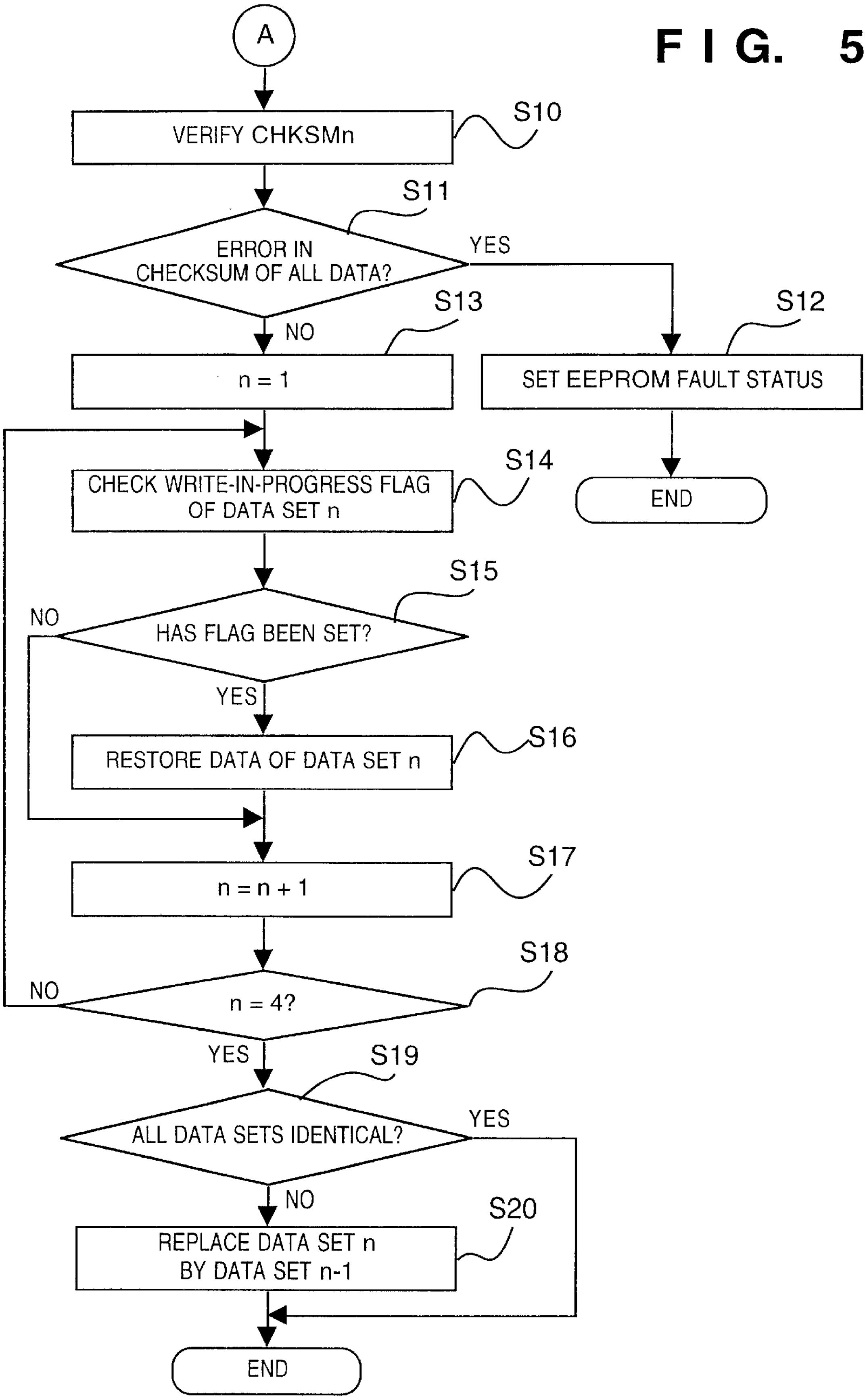
FIG. 5 is a flowchart showing an operation for reading a data set out of the EEPROM in the first embodiment.

FIGS. 4 and 5 are flowcharts showing the operation for reading data sets out of the EEPROM according to the first embodiment of the invention.

Step S1 in FIG. 4 calls for the content of all data sets 1, 2 and 3 of EEPROM 5 to be read out and stored in the RAM within the CPU 2. Step S2 calls for 1 to be set in a counter (not shown) for counting n, which indicates the data-set number. Next, step S3 calls CHKSMn to be initialized to 0, where CHKSMN is a flag that is set if an error is detected when the data sets are subjected to error detection based upon their checksums. The n of CHKSMn is the value of n counted at step S2; in this case, we have CHKSM1, CHKSM2, CHKSM3 for each data set.

Next, at step S4, data set n is subjected to error detection based upon the checksum and it is determined whether the data set n has an error. It should be noted that the write-in-progress flag does not take part in the calculation of the checksum, as mentioned above. If there is no error ("NO" at step S5), control proceeds to step S7. If there is an error ("YES" at step), then control proceeds to step S6, where 1 is set at CHKSMn.

The value of the counter is incremented at step S7, and it is determined at step S8 whether the checking of the checksums of all data sets is finished. In accordance with the first embodiment, the determination as to whether the checking of the checksums of all data sets is finished is made by judging whether the value in the counter is 4. If the checking of checksums is not finished ("NO" at step S8), control returns to step S3. If the checking of checksums is finished ("YES" at step S8), then control proceeds to step S10.

Here the result of error detection based upon the checksums of all data sets is verified using CHKSMn. It is determined at step S11 whether CHKSMN of all data sets has been set to 1. If 1 has been set as the CHKSMn of all data sets ("YES" at step S11), control proceeds to step S12, where fault status of the EEPROM 5 is set and processing is terminated. If 1 has not been set as the CHKSMn of all data sets ("NO" at step S11), then control proceeds to step S13.

The value in the counter is initialized to 1 at step S13, then whether the write-in-progress flag of the data set indicated by the counter value has been set or not is checked at step S14. It is determined at step S15 whether the write-in-progress flag has been set. If the write-in-progress flag has not been set ("NO" at step S15), then it is construed that the data set is normal and, hence, control proceeds to step S17. If the write-in-progress flag has been set ("YES" at step S15), then it is construed that the data set is abnormal and processing for restoring the data set is executed at step S16. The processing for restoring a data set involves overwriting the content of a data set, whose write-in-progress flag has been set, with the content of a data set for which an error was not detected the last time error detection processing was executed based upon the checksum. The overwrite data set is made a data set having a younger number. In other words, if the overwritten data set is data set 3, the overwrite data is will be data set 2. Next, at step S17, the value in the counter is updated.

It is then determined at step S18 whether the processing of all data sets has been completed. It should be noted that according to the first embodiment, it is determined whether the processing of all data sets has been completed by judging whether the value in the counter is 4. If the processing of all data sets has not been completed ("NO" at step S18), control returns to step S14. If the processing of all data sets has been completed ("YES" at step S18), control proceeds to step S19. Here it is verified whether all valid data sets are identical. For example, if, at the moment the writing of data set 1 ends normally the power supply is turned off and write processing ends before the writing of the next data set begins, the check sums of each of the data sets will not be abnormal and the write-in-progress flags will not have been set. Nevertheless, the content of data set 1 and the contents of other data sets will differ. Step S19 is executed on order to check whether this phenomenon has occurred.

Next, at step S20, the content of data set 2 is rewritten by the content of data set 1 and, in successive fashion, the content of data set n is written by the content of data set n–1. As a result, all data sets can be updated to the latest data. It should be noted that this is possible because the above-described write operation is performed successively starting from data set 1.

In a case where it is detected at step S15 that the write-in-progress flag of data set 1 has been set, this means that writing of a normal data set did not take place even once the last time. In such case overwriting is performed using the data set that prevailed the time before last. In other words, data from the data set 2 onward is data that was written the time before last. Accordingly, the data of data set 3, for example, is overwritten by the data of data set 1.

In accordance with the first embodiment, as described above, the write-in-progress flag, which indicates the propriety of writing a data set, is written to the EEPROM 5 when a data set is written to the EEPROM 5. Then, when writing is completed, the fact that writing could not end normally because, say, power was cut off during writing can be detected based upon the existence of the write-in-progress flag. Further, data can be recovered by copying the data of a normal data set to the data set whose writing was in progress. Accordingly, if an abnormality develops in a checksum for a reason other than malfunction of the EEPROM 5, the data is recovered. This means that the number of data sets need not be enlarged unnecessarily and that the redundancy of data need not be increased.

The present invention is applicable also to a case where the printer is provided with an EEPROM and data set management is performed on the printer side.

[Second Embodiment]

The constitution of the memory map of EEPROM 5 is not limited to that of the memory map shown in FIG. 2 of the first embodiment. For example, the memory map may be configured as shown in FIG. 6.

Figure 6:
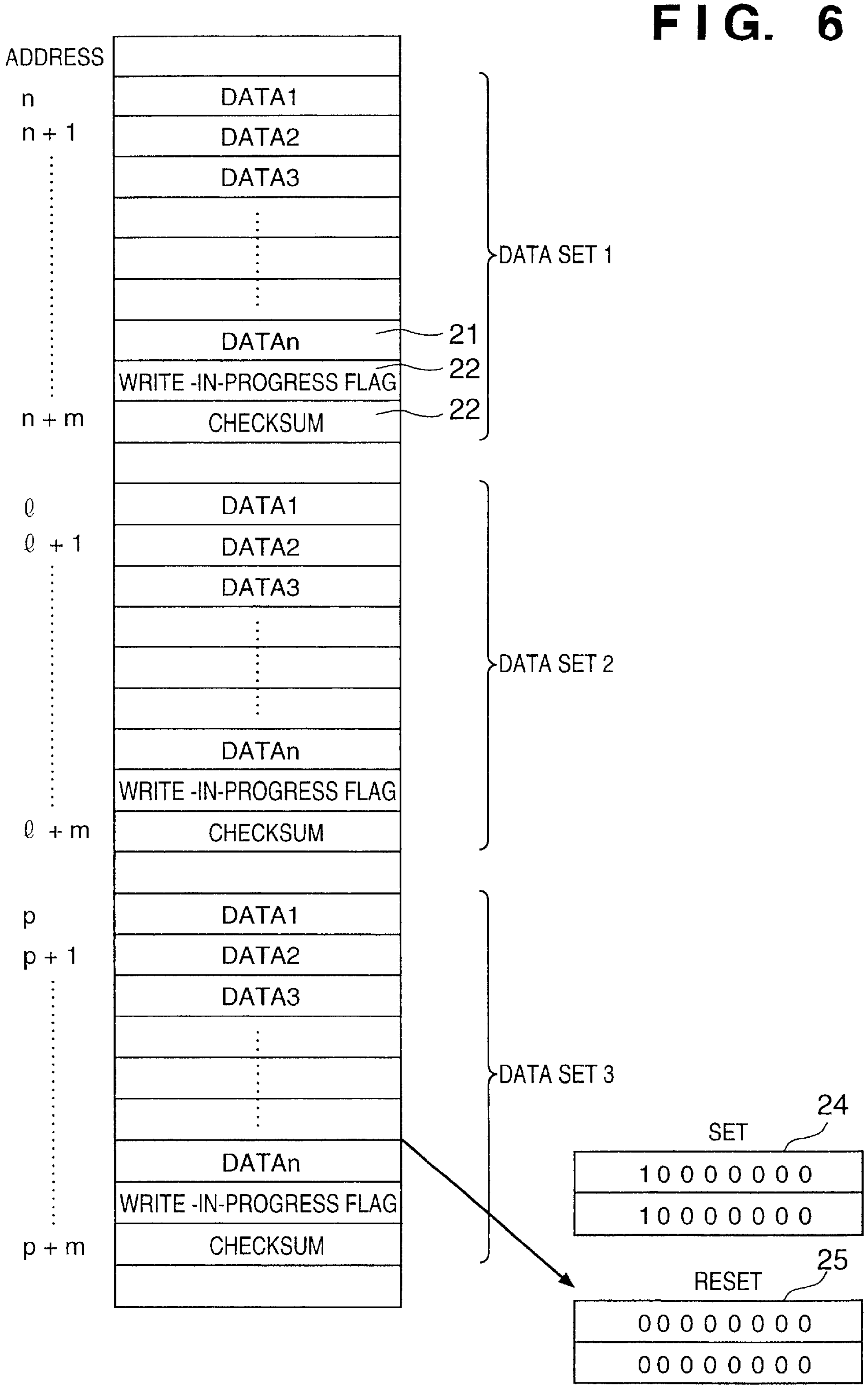
FIG. 6. is a diagram showing the memory map of an EEPROM according to a second embodiment of the present invention.
Figure 7:
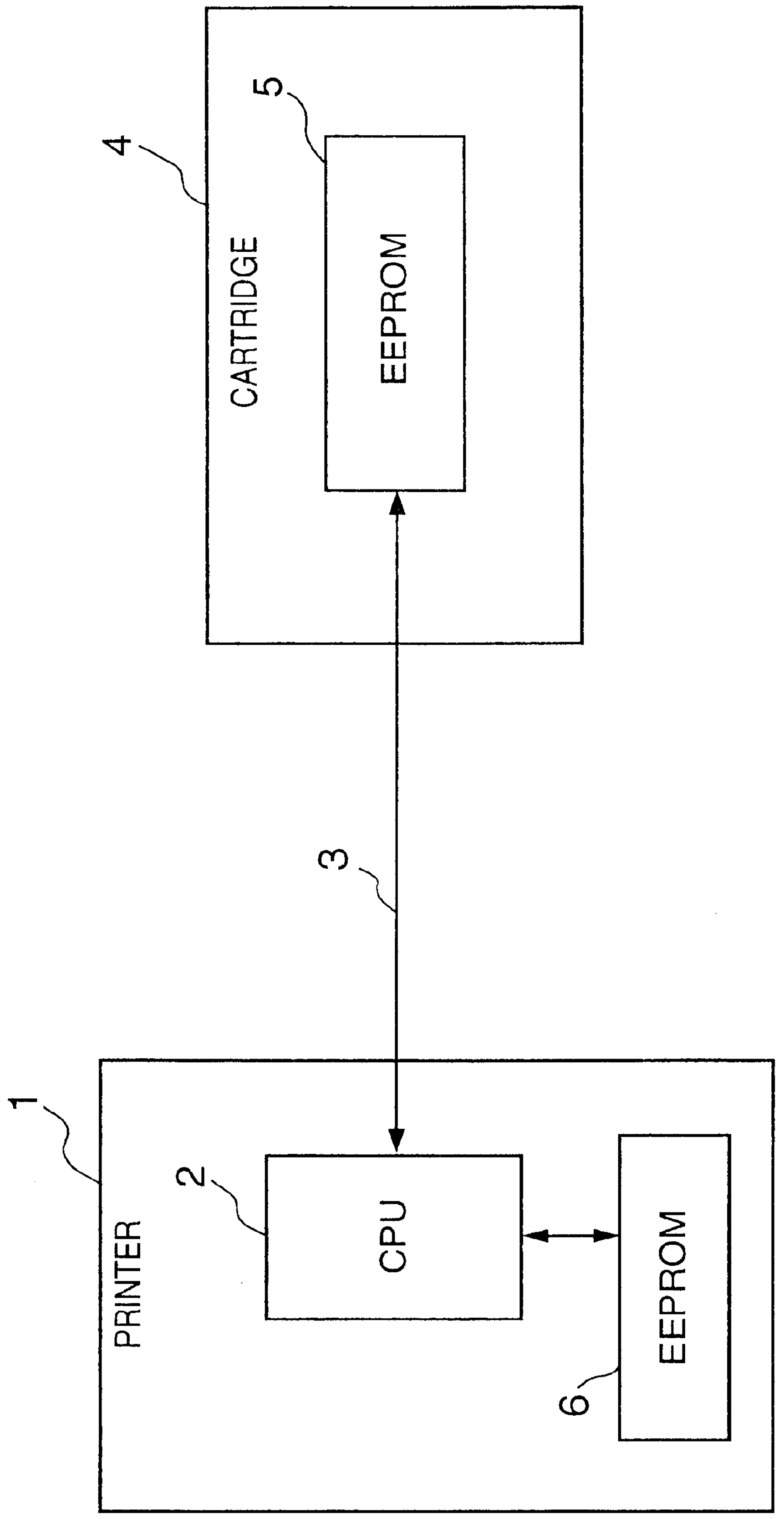
FIG. 7 is a block diagram showing the construction of an image forming apparatus according to a third embodiment of the present invention.

FIG. 6 is a diagram showing the memory map of an EEPROM according to a second embodiment of the present invention.

The memory map shown in FIG. 6 differs from that shown in FIG. 2 of the first embodiment in the constitution of write-in-progress flags. In the second embodiment, write-in-progress flags 21, 22 are constituted by two words, as shown in FIG. 6. If the write-in-progress flags are in the set state, then the content of the data is made as indicated at numeral 24. Specifically, only the most significant bit of each word is made "1" and the other bits are made "0". In the case of the reset state, on the other hand, the content of the data is made as indicated at numeral 25. In other words, all bits of each word are made "0". These write-in-progress flags are included in the computation of the checksum.

With the exception of the above, the data-set write/read operation is basically the same as that described in the first embodiment. The only difference is that when the checking of the checksums at step S23 in FIG. 3 and step S4 in FIG. 4 is performed, the write-in-progress flags are included in the calculations. More specifically, ordinarily a write-in-progress flag is written in after the checksum value is written, as a consequence of which the checksum value changes if the write-in-progress flag is included in the calculation of the checksum. However, according to the second embodiment, even though the content of a write-in-progress flag changes after the checksum value is written, there is no effect upon the checksum value by virtue of the arrangement described above. Further, if even one of the two words develops a fault, this can be detected by the checksum.

Thus, in accordance with the second embodiment, as described above, two write-in-progress flags are provided. As a result, even of one of the write-in-progress flags develops a fault, accurate error detection can be carried out at all times so long as the other of the write-in-progress flags is not faulty. Essentially, this makes it possible to reduce the probability that a write-in-progress flag will develop a fault.

[Third Embodiment]

Figure 8:
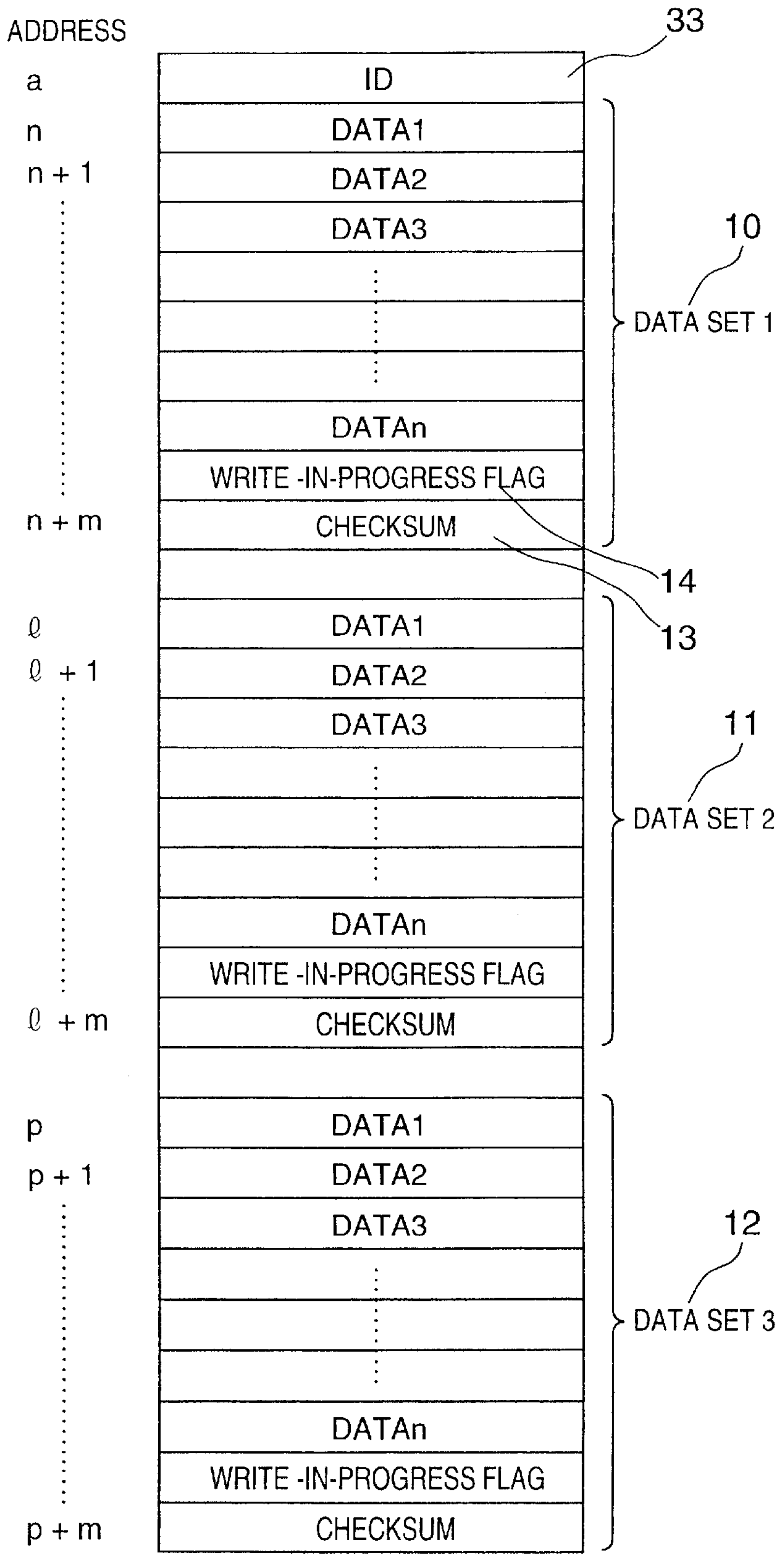
FIG. 8. is a diagram showing the memory map of an EEPROM according to the third embodiment.

FIG. 3 is a block diagram showing a third embodiment of the present invention. Here the arrangement is such that an EEPROM 6 serving as a non-volatile memory is mounted on the printer side as well. The memory map of the EEPROM 6 on the cartridge side is as shown in FIG. 8. In this case ID information 33 for individually identifying the cartridge is stored within the EEPROM 5. Further, it is assumed that content, inclusive of this ID information, identical with that of the data sets in the EEPROM 5 of the cartridge has been copied to the EEPROM 6 in the printer.

Further, in a case where it has become necessary to update the memory content owing to operation of the printer, it is assumed that the updating of EEPROM 6 of the printer is performed before the updating of the content of EEPROM 5 mounted on the cartridge.

Figure 9:
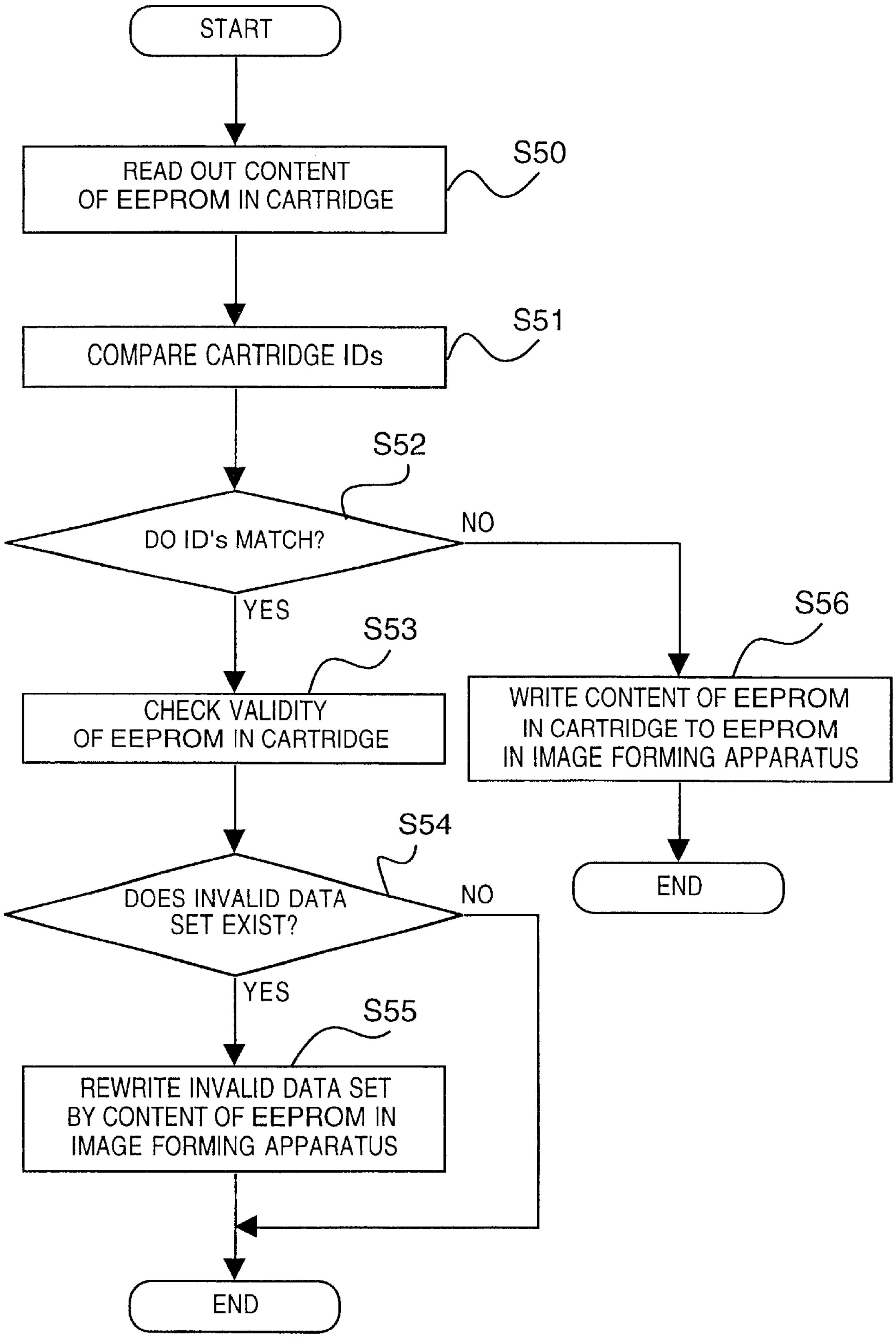
FIG. 9 is a flowchart showing an operation for reading a data set out of the EEPROM in the third embodiment.

A specific example of an error processing operation will now be described with reference to the flowchart of FIG. 9.

The content of the EEPROM 5 in the cartridge is read out at step S50. This is followed by step S51, at which the ID that has been stored in EEPROM 5 of the cartridge is compared with the ID that has been stored in the EEPROM 6 of the printer proper. If the two do not match ("NO" at step S52), the content, inclusive of the ID information, of EEPROM 5 of the cartridge is copied to the EEPROM 6 of the printer proper.

The fact that the ID that has been stored in EEPROM 5 of the cartridge does not match the ID that has been stored in the EEPROM 6 in the printer means that the cartridge has been replaced. If the two match, this means that the cartridge has not been replaced.

After the content of EEPROM 5 has been copied to EEPROM 6, it will suffice to execute the processing of the first embodiment described above.

If it is found at step S51 that the IDs match, the validity of the data set in the EEPROM 5 of the cartridge is checked at step S53. The method described in the first and second embodiments may be used to check validity. If an invalid data set exists ("YES" at step S54), a valid data set that has been stored in EEPROM 6 of the printer is written over the invalid data set in EEPROM 5 of the cartridge at step S55. The data sets in EEPROM 6 of the printer were written before the data sets of EEPROM 5 of the cartridge. If a write-in-progress progress flag has been set for a data set in EEPROM 5 of the cartridge, therefore, then the writing of data sets to the EEPROM 6 of the printer will have been completed. Accordingly, by rewriting an invalid data set of EEPROM 5 of the cartridge to a data set in EEPROM 6 of the printer, recovery of the data set becomes possible.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling an image forming apparatus that forms an image using a removable image-forming cartridge having a memory, comprising:

a setting step of setting a write-in-progress flag before writing a data set to the said memory;

a writing step of writing a data set to said memory after the write-in-progress flag has been set;

a resetting step of resetting the write-in-progress flag after the data set has been written;

a step of writing a plurality of data sets of identical content to said memory by repeating said setting step, said writing step and said resetting step;

an evaluation step of evaluating validity of each of the data sets, which have been written to said memory, based upon states of the write-in-progress flags; and an updating step of updating a data set, which has been evaluated as being invalid, to content of another data set evaluated as being valid.

2. The method according to claim 1, wherein said updating step updates said data set to the content of a data set that was written before a data set evaluated as being invalid.

3. The method according to claim 1, wherein said data set includes data representing a cumulative number of times image forming has been performed.

4. The method according to claim 1, further comprising a step of calculating a checksum of each data set, wherein a write-in-progress flag is set at said setting step by writing a first set of data of prescribed units having no effect upon a checksum.

5. The method according to claim 4, wherein a write-in-progress flag is reset at said resetting step by writing a second set of data of prescribed unit having no effect upon a checksum.

6. The method according to claim 1, wherein invalid data sets are updated in the order of written data sets at said updating step.

7. The method according to claim 1, wherein a data set for which the write-in-progress flag has not been reset is evaluated as being an invalid data set at said evaluation step.

8. A method of controlling an image forming apparatus that forms an image using a removable image-forming cartridge having a first memory, comprising:

a step of writing a data set to a second memory provided on the image forming apparatus;

a step of writing a data set, the content of which is identical with that of the data set that has been written to said second memory, to said first memory a prescribed number of times after writing of the data set to said second memory ends;

a step of evaluating validity of each of the data sets that have been written to said first memory; and an updating step of updating a data set, which has been evaluated as being invalid, to content of the data set that has been stored in said second memory.

9. The method according to claim 8, further comprising:

a step of writing identification information that identifies the cartridge to said second memory;

a comparison step of comparing the identification of the cartridge with identification information that has been written to said second memory; and a step of writing a data set, which has been written to said first memory, to said second memory if the two items of identification information do not match.

10. The method according to claim 9, wherein said updating step is executed on the condition that the two items of identification information match.

11. The method according to claim 8, wherein said data set includes data representing a cumulative number of times image forming has been performed.

12. An image forming apparatus that forms an image using a removable image-forming cartridge having a memory, comprising:

writing means for writing a data set of identical content to said memory a plurality of times, said writing means setting a write-in-progress flag before writing each data set and resetting the write-in-progress flag after the writing of each data set ends;

evaluation means for evaluating validity of each of the data sets, which have been written to said memory, based upon states of the write-in-progress flags; and updating means for updating a data set, which has been evaluated as being invalid, to content of another valid data set.

13. The apparatus according to claim 12, wherein said updating means updates said data set to the content of a data set that was written before a data set evaluated as being invalid.

14. The apparatus according to claim 12, wherein said data set includes data representing a cumulative number of times image forming has been performed.

15. The apparatus according to claim 12, further comprising checking means for calculating a checksum of each data set, said writing means setting a write-in-progress flag by writing a first set of data of prescribed units having no effect upon a checksum.

16. The apparatus according to claim 15, wherein said writing means resets a write-in-progress flag by writing a second set of data of prescribed unit having no effect upon a checksum.

17. The apparatus according to claim 12, wherein said updating mean updates invalid data sets in the order of written data.

18. The apparatus according to claim 12, wherein said evaluation means evaluates a data set for which the write-in-progress flag has not been reset as being an invalid data set.

19. An image forming apparatus that forms an image using a removable image-forming cartridge having a first memory, comprising:

first writing means for writing a data set to a second memory with which the image forming apparatus is provided;

second writing means for writing a data set, the content of which is identical with that of the data set that has been written to said second memory, to said first memory a prescribed number of times after writing of the data set to said second memory ends;

evaluation means of evaluating validity of each of the data sets that have been written to said first memory; and updating means for updating a data set, which has been evaluated as being invalid, to content of the data set that has been stored in said second memory.

20. The apparatus according to claim 19, further comprising:

third writing means for writing identification information that identifies the cartridge to said second memory;

comparison means for comparing the identification of the cartridge with identification information that has been written to said second memory; and fourth updating means for writing a data set, which has been written to said first memory, to said second memory if the two items of identification information do not match.

21. The apparatus according to claim 19, wherein said updating means executes updating on the condition that the two items of identification information match.

22. The apparatus according to claim 19, wherein said data set includes data representing a cumulative number of times image forming has been performed.

23. A computer-readable storage medium storing a program for causing an image forming apparatus, which forms an image using a removable image-forming cartridge having a memory, to execute the following steps:

a setting step of setting a write-in-progress flag before writing a data set to the said memory;

a writing step of writing a data set to said memory after the write-in-progress flag has been set;

a resetting step of resetting the write-in-progress flag after the data set has been written;

a step of writing a plurality of data sets of identical content to said memory by repeating said setting step, said writing step and said resetting step;

an evaluation step of evaluating validity of each of the data sets, which have been written to said memory, based upon states of the write-in-progress flags; and an updating step of updating a data set, which has been evaluated as being invalid, to content of another data set evaluated as being valid.

24. A method of controlling an image forming apparatus that forms an image using a removable image-forming cartridge, comprising:

a step of writing a write-in-progress flag to a memory before a data set regarding life of the cartridge;

a step of writing a data set to said memory after the write-in-progress flag has been set;

a resetting step of resetting the write-in-progress flag after the data set has been written;

a step of writing a plurality of data sets of identical content to said memory by repeating said setting step, said writing step and said resetting step;

an evaluation step of evaluating validity of each of the data sets, which have been written to said memory, based upon states of the write-in-progress flags; and an updating step of updating a data set, which has been evaluated as being invalid, to content of another data set evaluated as being valid.

* * * * *

UNITED STATES PATENT AND TRADEMARK OFFICE

CERTIFICATE OF CORRECTION

PATENT NO. : 6,421,137 B1

DATED : July 16, 2002

INVENTOR(S) : Soya Endo

It is certified that error appears in the above-identified patent and that said Letters Patent is hereby corrected as shown below:

Column 1,
Line 28, "considerably" should read -- considerable --.

Column 3
Line 64, "CHKSMN" should read -- CHKSMn --.

Column 4,
Line 36, "on" should read -- in --.

Column 5,
Line 42, "of" should read -- if --.

Column 7
Line 35, "unit" should read -- units --.

Column 8,
Line 35, "unit" should read -- units --; and
Line 38, "mean" should read -- means --.

Signed and Sealed this

Twenty-first Day of January, 2003

JAMES E. ROGAN
*Director of the United States Patent and Trademark Office*